United States Patent [19]
von Wiesenthal

[11] 3,955,552

[45] May 11, 1976

[54] HEATER FOR LARGE FLOWS AT LOW PRESSURE LOSSES

[75] Inventor: Peter von Wiesenthal, New York, N.Y.

[73] Assignee: Heat Research Corporation, New York, N.Y.

[22] Filed: Feb. 24, 1975

[21] Appl. No.: 552,131

Related U.S. Application Data

[63] Continuation-in-part of Ser. No. 462,050, April 18, 1974, abandoned.

[52] U.S. Cl. .............................. 126/110 R; 165/83; 126/110 AA; 126/99 C
[51] Int. Cl.² .......................................... F24H 3/02
[58] Field of Search ....... 126/110 R, 110 AA, 99 R, 126/99 C, 110 B, 106; 165/83

[56] References Cited
UNITED STATES PATENTS

| | | | |
|---|---|---|---|
| 1,519,673 | 12/1924 | Doble............................ | 126/110 R |
| 1,558,848 | 10/1925 | Doble, Jr. ...................... | 126/110 R |
| 1,932,610 | 10/1933 | Tilley............................. | 165/83 |
| 2,057,033 | 10/1936 | Kelley............................ | 126/110 R |
| 2,073,424 | 3/1937 | LaFay............................ | 126/110 R |
| 2,379,017 | 6/1945 | McCollum ..................... | 126/110 R |
| 2,468,903 | 5/1949 | Villiger.......................... | 165/83 |
| 2,472,497 | 6/1949 | Stookey......................... | 432/209 |
| 2,704,062 | 3/1955 | Beyerman...................... | 126/110 R |
| 2,828,946 | 4/1958 | Smith............................. | 165/83 |
| 2,893,374 | 7/1959 | Wilson, Sr...................... | 126/110 R |
| 3,183,967 | 5/1965 | Mettenleiter et al. ......... | 165/83 |
| 3,189,086 | 6/1965 | Esser et al. ................... | 165/83 |
| 3,220,402 | 11/1965 | Brelsford et al. ............. | 126/110 R |
| 3,433,212 | 3/1969 | Hofmeyer ...................... | 126/110 R |
| 3,547,202 | 12/1970 | Ticknor .......................... | 165/83 |
| 3,794,014 | 2/1974 | McVickar et al. ............. | 126/110 R |

FOREIGN PATENTS OR APPLICATIONS

| | | | |
|---|---|---|---|
| 458,966 | 10/1913 | France............................ | 126/90 |

*Primary Examiner*—John J. Camby
*Assistant Examiner*—Henry C. Yuen
*Attorney, Agent, or Firm*—Charles E. Baxley

[57] ABSTRACT

This disclosure teaches a heater which is especially well suited to handle large flows of a process stream at low pressure losses. A cylindrical sleeve is mounted by means of a bellows inwardly of a cylindrical shell to separate an inner hot gas flow space from an annular outer process flow space. The sleeve encloses an entrance combustion zone and has an exit end. A baffle is mounted inwardly of the sleeve with a closed end projecting into the exit end of the sleeve to channel the hot gas into an annular convection space bordered outwardly by the sleeve. Extended surface projects from the sleeve into the process flow space and additional extended surface projects from the sleeve into the convection space.

1 Claim, 5 Drawing Figures

HEATER FOR LARGE FLOWS AT LOW PRESSURE LOSSES

CROSS REFERENCE

This is a continuation-in-part application with respect to my copending application Ser. No. 462,050 filed Apr. 18, 1974, now abandoned,

BACKGROUND OF INVENTION

There are numerous situations wherein it is necessary to heat large flows and wherein low pressure losses are mandated. Cases in point (inter alia) are air preheaters, particularly those used in incineration systems. Such heating of large flows at low pressure losses have been difficult to achieve by prior art installations in terms of capital cost, thermal efficiency and the like.

BRIEF STATEMENT OF INVENTION

The present disclosure solves problems of prior art installations in a particularly useful, novel, unobvious and facile way. A cylindrical sleeve is mounted inwardly of a cylindrical shell to separate a cylindrical inner hot gas flow space from an annular outer process flow space. The sleeve encloses an entrance combustion zone and has an exit end. A baffle is mounted inwardly of the sleeve with a closed end projecting into the exit end of the sleeve to channel the hot gas into an annular convection space bordered outwardly by the sleeve. Extended surface projects from the sleeve into the process space and additional extended surface projects from the sleeve into the convection space.

One object of this invention is to heat large flows at low pressure losses.

Another object of this invention is to improve thermal efficiency.

Still another object of this invention is to fabricate a heater of the type here contemplated employing inexpensive materials.

Still another object of this invention is to fabricate a heater of the type here contemplated which will accommodate either conventional burners or an external source as a means to provide the hot gas.

Still another object of this invention is to fabricate a heater of the type here contemplated which can be either cocurrent or countercurrent. Still another object of this invention is to fabricate a heater of the type here contemplated which can allow conveniently for differential thermal expansion of parts thereof.

Still another object of this invention is to fabricate a heater of the type here contemplated which is particularly well adapted to incineration systems, wherein the process stream is combustion air and the hot gas is derived from materials being incinerated. Fuel requirements to achieve incineration temperature levels are drastically reduced thereby.

Still another object of this invention is to fabricate a heater of the type here contemplated wherein the hot gas space is at an elevated pressure so that structural requirements of the sleeve can be reduced.

Still another object of this invention is to fabricate a heater of the type here contemplated which is simple to design, build and maintain.

Still another object of this invention is to fabricate a heater of the type here contemplated which is suited well otherwise to its intended functions.

DESCRIPTION OF DRAWINGS

The foregoing and other objects, features and advantages will be seen more fully from a detailed description of preferred embodiments which follows and from a claim which also follows, all viewed in conjunction with an accompanying drawing wherein:

DESCRIPTION OF PREFERRED EMBODIMENTS

Figures 1, 2, 3, 4, 5:
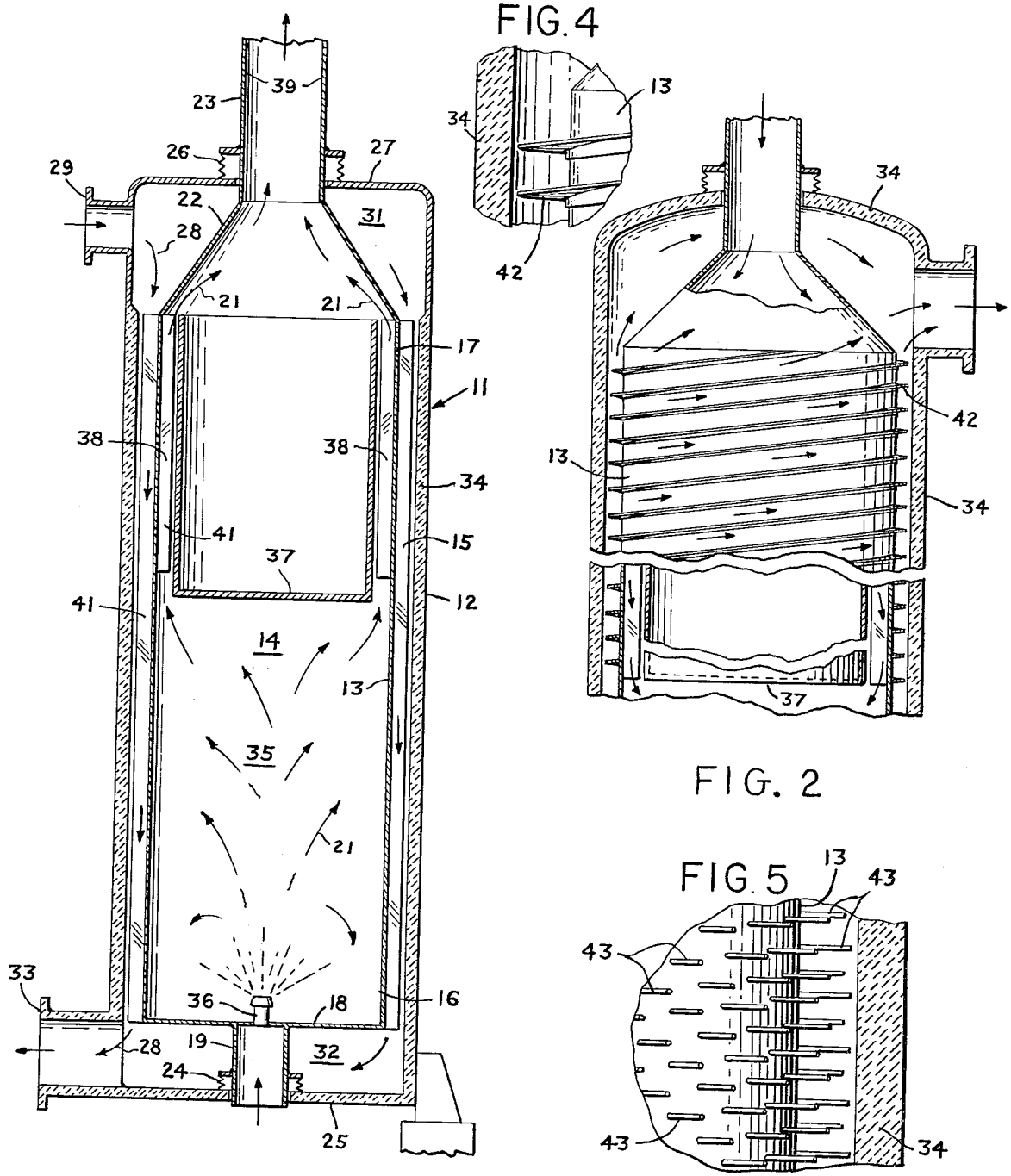
FIG. 1 is a vertical view in section of a heater according to the present invention with longitudinal fins mounted on the sleeve as the extended surface.
FIG. 2 is a broken sectional view of a portion of a heater according to this invention with fins wound helically on the sleeve to serve as the extended surface.
FIG. 3 is a broken sectional view of the sleeve with studs mounted on the sleeve to serve as the extended surface.
FIG. 4 is an enlarged detail view of extended surface of FIG. 2.
FIG. 5 is an enlarged detail view of extended surface of FIG. 3.

As seen in FIG. 1, a heater generally designated 11 includes a vertical cylindrical shell 12 supported by a suitable structural system. A sleeve 13 is mounted in the shell 12 to separate a cylindrical inner flow space 14 from an annular outer flow space 15. The sleeve 13 has an entrance end 16 at its bottom and an exit end 17 at its top. The entrance end 16 is connected in sealed engagement to a partition 18 which in turn is connected in sealed engagement to a conduit 19 via which hot gas 21 is introduced into the inner flow space 14. The exit end 17 of the sleeve 13 is connected in sealed engagement to a hood 22 which in turn is connected in sealed engagement to a stack 23 via which the hot gas 21 exits from the inner flow space 14. The sleeve 13 can be supported at its top, in which case differential thermal expansion between the sleeve and the shell can be taken care of by providing a bellows 24 between the conduit 19 and a bottom 25 of the shell 12. Alternately the sleeve 13 can be supported anywhere along its length with expansion being accommodated partially in each direction, and in this case another bellows 26 could be provided between a top 27 of the shell 12 and the stack 23.

According to this invention the process stream 28 is passed through the outer flow space 15. Flow of the process stream 28 is shown here to be downward in countercurrent heat exchange relationship with upward flow of the hot gas 21, but it is sometimes desirable to flow the process stream 28 cocurrently with the hot gas 21 and this cocurrent flow also can be accomplished by means of the heater of this invention as will be understood by those skilled in heater design. The process stream 28 is shown to enter via line 29 into an upper plenum 31 (enclosed between the top 27 of the shell 12 and the hood 22) then to pass downwardly through the outer flow space 15 into a lower plenum 32 (enclosed between the partition 18 and the bottom 25 of the shell) then to exit via a line 33.

The shell 12 is lined with an insulating refractory 34 to reduce heat losses to the surroundings. This refractory 34 can be applied internally (as shown) or externally of the shell 12, depending upon circumstances. If the refractory 34 is applied externally of the shell 12, the shell 12 will run hotter reducing temperature differential between the shell 12 and the sleeve 13.

The hot gas 21 may be provided by burning a fuel in a radiant zone 35 of the inner flow space 14 using one or more burners 36 (which penetrate the bottom 25 of the shell 12) or some other source of the hot gas 21 may be employed. Usually the hot gas 21 will give up some of its heat by means of radiant heat transfer in the radiant zone 35. The size of the radiant zone 35 is a function of the temperature and constitution of the hot gas 21 and/or the combustion space required. At very low radiating temperatures or low heat input rates, the radiant zone 35 required could be practically nil, in which case the heater 11 would operate on substantially convection principles.

It is important to extract heat from the hot gas by means of convective transfer as well as by radiant transfer. Toward this objective a baffle 37 is mounted inwardly of the sleeve 13 to channel the hot gas 21 into a convection passage 38 which is bordered in part by the sleeve 13 and which connects the radiant zone 35 in flow series with the interior 39 of the stack 23.

Extended surface used in this heater 11 may be in the form of longitudinally organized fins 41 as shown in FIG. 1, helically organized fins 42 as shown in FIG. 2, studs 43 as shown in FIG. 3 or any other commercially available system of like kind. As shown in FIG. 1, longitudinal fins 41 extend from the sleeve 13 outwardly into the outer flow space 15 to allow a large metal surface area in heat exchange relationship with the process stream 28 so as to conduct heat thereto without need for passing the process stream through tubes (at a consequent pressure loss penalty). Longitudinally organized fins 41 also extend inwardly from the sleeve 13 into the convection passage 38 to improve heat collection (by means of convective transfer) from the hot gas 21 passing therethrough. Heat transfer to the sleeve 13 in the vicinity of the radiant zone 35 is substantially by means of radiation. The same principles are involved in the embodiments of FIGS. 2 and 3 with the only differences being that the extended surfaces used therein are helically organized fins 42 and studs 43 respectively.

If desired the inner flow space 14 may be operated to superatmospheric pressure to reduce pressure differential between the inner 14 and the outer 15 flow spaces, thereby reducing wall thickness requirements of the sleeve 13.

It will be understood by those familiar with heater design that wide deviations may be made from the preferred embodiments here described without departing from a main theme of invention set forth in a claim which follows.

I claim:

1. A heater for a large flow of air to be heated at a low pressure loss for use in an incinerator, the heater comprisng in combination: a cylindrical shell, a cylindrical sleeve mounted coaxially in the shell and separating to form an inner flow space and an outer flow space, a bellows positioned about the sleeve outwardly of the shell and connecting the sleeve expandably to the shell at one end of the shell and the sleeve connected fixedly to the shell at the other end of the shell, air means for passing the air to be heated through the outer flow space, hot gas means for passing a hot gas through the inner flow space, the hot gas means including at least one burner connected to supplies of fuel and oxygen as well as penetrating the shell to introduce the hot gas into the inner flow space, the sleeve having an entrance end for entry of the hot gas and an exit end for exit of the hot gas, outer extended surface projecting from the sleeve into the outer flow space, a baffle mounted inwardly of the sleeve and organized to channel the hot gas into a convection passage boardered outwardly by the sleeve and inwardly by the baffle, inner extended surface projecting from the sleeve into the convection passage, the baffle cylindrical with a closed end projecting into the exit end of the sleeve so that the convection passage is annular and located in the vicinity of the exit end, means to provide superatmospheric pressure in the inner flow space.

* * * * *